United States Patent [19]

Bannon

[11] Patent Number: 4,484,985
[45] Date of Patent: Nov. 27, 1984

[54] DISTILLATION AND CONDENSING PROCESS

[75] Inventor: Robert P. Bannon, Houston, Tex.

[73] Assignee: Shell Oil Company, Houston, Tex.

[21] Appl. No.: 497,475

[22] Filed: May 23, 1983

[51] Int. Cl.$^3$ .............................................. B01D 3/14
[52] U.S. Cl. ........................................ 203/42; 203/39; 203/87; 203/98; 202/185 A; 208/349; 208/368; 208/369
[58] Field of Search ....................... 203/42, 87, 94, 98, 203/DIG. 9; 208/342, 348, 349, 357, 358, 368, 369; 202/185 A, 186, 182–184; 62/17, 29; 196/99, 140

[56] References Cited

U.S. PATENT DOCUMENTS

| | | | |
|---|---|---|---|
| 2,398,396 | 4/1946 | Powell | 203/87 |
| 2,915,462 | 12/1959 | Salmon | 202/185 A |
| 3,039,941 | 6/1962 | Sweeney et al. | 203/87 |
| 3,320,159 | 5/1967 | Potts | 203/87 |
| 3,401,093 | 9/1968 | Cox | 203/87 |
| 3,427,228 | 2/1969 | Constantikes et al. | 203/87 |
| 3,493,470 | 2/1970 | Irvin | 203/87 |
| 3,824,177 | 7/1974 | Honerkamp et al. | 203/42 |
| 4,235,706 | 11/1980 | Bannon | 203/87 |

Primary Examiner—Wilbur Bascomb
Attorney, Agent, or Firm—Albert J. Adamcik

[57] ABSTRACT

A process for distilling and condensing a multi-component liquid is described, the process being characterized by the use of a portion of the uncondensed vapor in achieving more efficient heat utilization. In a principal embodiment, the multi-component liquid is distilled to produce an overhead vapor, and the vapor is condensed to produce a condensate and a partially cooled vapor. The partially cooled vapor is separated into major and minor portions, the bulk of the major portion is condensed to produce a condensation effluent, and the condensation effluent (comprising liquid or liquid and vapor) is contacted in a contacting zone with the minor portion of partially cooled vapor. The contacting produces a liquid which is collected in an accumulation zone.

4 Claims, 2 Drawing Figures

DISTILLATION AND CONDENSING PROCESS

BACKGROUND OF THE INVENTION

Rapid escalation of energy costs in recent years has spurred efforts to improve efficiency in plant operations. Distillation practices have received great attention, since the process of distillation, the predominant unit operation in the oil refining and chemical industries, consumes prodigious amounts of energy.

One energy-saving procedure is the practice of multiple stage, e.g., two-stage, condensation of the overhead vapors from a distillation column. Multi-stage condensation procedures allow energy savings by permitting the use of higher temperature at which heat may be removed from the overhead vapor. Such a process is described, for example, in U.S. Pat. No. 3,320,159. In at least one two-stage procedure for condensation of distillation column overhead vapors, the first stage of condensation is operated under conditions to condense just enough liquid to provide reflux for the distillation column, and the second stage of condensation is operated under conditions to provide the top product of the column. For two-stage condensation to be of value in heat recovery, the vapor or top product from the distillation column must be a multi-component mixture, and there must be a reasonable temperature spread between its dew point and bubble point, e.g. 20 degrees F. Most hydrocarbon distillations fit this requirement.

A very common commercial process for which two-stage condensation can be helpful is the separation of gasoline boiling range materials (often 400° to 430° F. ASTM end point) as the top product from a feed containing also kerosene, jet fuel, distillate fuel and gas oil components. Two-stage condensation procedures, however, have disadvantages of added capital cost and increased complexity. In general, the process, as known, has required the use of two accumulators, with interconnecting piping, pumps, etc. My U.S. Pat. No. 4,235,706, issued Nov. 25, 1980, and incorporated herein by reference, describes an improved process for distillation and multi-stage condensation of a multicomponent vapor, the process being characterized by the intergration and utilization of a unique accumulation zone, thereby providing effective reflux and reduced capital costs.

In the typical distillation column, the operating pressure is set so that overhead vapor may be condensed with the available cooling medium, usually cooling water or air. Normally, it is advantageous to keep the pressure as low as possible to increase the relative volatility of the feed components and thus lessen the reflux required for a given separation. As a consequence, the top product from the column is relatively cool; typically, only 20°–40° F. above the temperature of the cooling medium. If this product must be further processed at a higher temperature, for example, by further distillation, it must be reheated. The present invention seeks to conserve energy present in the vapor fraction from the distillation, and thereby reduce the overall energy consumption of the procedure.

SUMMARY OF THE INVENTION

Accordingly, the invention, in one embodiment, is a process comprising, (a) distilling a multi-component liquid in a distillation column under conditions effective to provide an overhead condensable vapor;

(b) separating the overhead condensable vapor into a major portion and a minor portion;

(c) condensing at least the bulk of the major portion in a condensation zone having at least one condensation stage, and producing a condensation zone effluent comprising liquid or vapor and liquid;

(d) passing condensation zone effluent to a contacting zone, and contacting condensation zone effluent with at least a portion of the minor portion of the overhead condensable vapor, and producing a second liquid; and (e) collecting second liquid from step (d) in an accumulation zone.

In a preferred embodiment, the invention relates to a process comprising, (a) distilling a multi-component liquid in a distillation column under conditions effective to provide an overhead vapor fraction having a temperature differential of a least 20° F. between its dew point and its bubble point;

(b) condensing a portion of the overhead fraction in a first condensation zone having at least one condensation stage, and producing liquid condensate and partially cooled vapor;

(c) passing liquid condensate to an accumulation zone, and separating partially cooled vapor from step (b) into a major portion and a minor portion;

(d) condensing at least the bulk of the major portion in a second condensation zone having at least one condensation stage, and producing a condensation zone effluent comprising liquid or vapor and liquid;

(e) passing condensation zone effluent to a contacting zone, and contacting condensation zone effluent with at least a portion of the minor portion of the partially cooled vapor, and producing a liquid fraction; and (f) collecting liquid fraction from step (e) in an accumulation zone. Most preferably, the accumulation zone used in step (f) is that employed in step (c), although a separate accumulation zone may be used. Preferably, the invention utilizes the accumulation zone technique of my previous patent in the preferred embodiment (it may be used in the first embodiment but is not necessary). Thus, the accumulation zone may comprise a first accumulation section and a second accumulation section having vapor communication with the first accumulation section but being separated from said first accumulation section by a barrier which provides limited flow of liquid between the first accumulation section and the second accumulation section, the first accumulation section and the second accumulation section being at different liquid temperatures. In this embodiment, reflux liquid is preferably returned to the column from the first accumulation section. Product is preferably withdrawn from the second accumulation section.

The liquid condensed may be collected in or after all, or fewer than all, of the condensation stages employed. As used herein, the term "condensation stage" or "stages", or variants thereof, refers to units or apparatus, individually or collectively, employed in converting vaporous material, under suitable conditions of temperature and pressure, to liquid. Collected liquids may be individually or collectively passed to one or more accumulation zones, each zone having a number of sections separated by barriers. The number of sections is equal to or less than the number of liquids passed to the particular accumulation zone. The precise volume of liquid condensed in the first stage or stages, or the volume of vapor separated as a minor portion, will depend on the many variables of the process, and may be determined by those skilled in the art. The key, as discussed further hereinafter, is the maximization of the heat content of the liquid fraction collected in the accumulation zone.

Preferably, liquid from the accumulation zone is used as reflux to the column. In its most preferred form, the invention comprises an embodiment wherein at least a fraction of the minor portion is passed through the accumulation zone before entering the contacting zone.

The invention may be applied to any liquid suitable for distillation and multi- or two-stage condensation. For example, the invention may be employed in crude oil distillation processes, and in distillation of products from conversion processes such as catalytic cracking, hydrocracking, and delayed coking. The invention is preferably utilized in distillation processes in which the top product separated is a gasoline fraction. In such cases, the top product would be a multi-component mixture, and there should be a reasonable temperature differential, say at least 20° F. to 250° F., between its dew point and bubble point. However, the invention is also suitable for separations of substantially pure product, for example, the separation of isopentane from n-pentane. In such cases, no substantial advantage accrues from the use of the procedure as described in the second embodiment as compared with the procedure of the first embodiment. The particular conditions applied, i.e., pressure, temperature, throughput, etc., are those applicable to multi- or two-stage condensation, and are well understood by those skilled in the art. In any event, the salient feature of the invention is the use of a portion of the overhead vapor to enhance heat content of the liquid product. By utilizing the heat of this minor portion, additional separation steps on the product, such as distillation, do not require as much heat input.

DETAILED DESCRIPTION OF THE INVENTION

Figure 1:
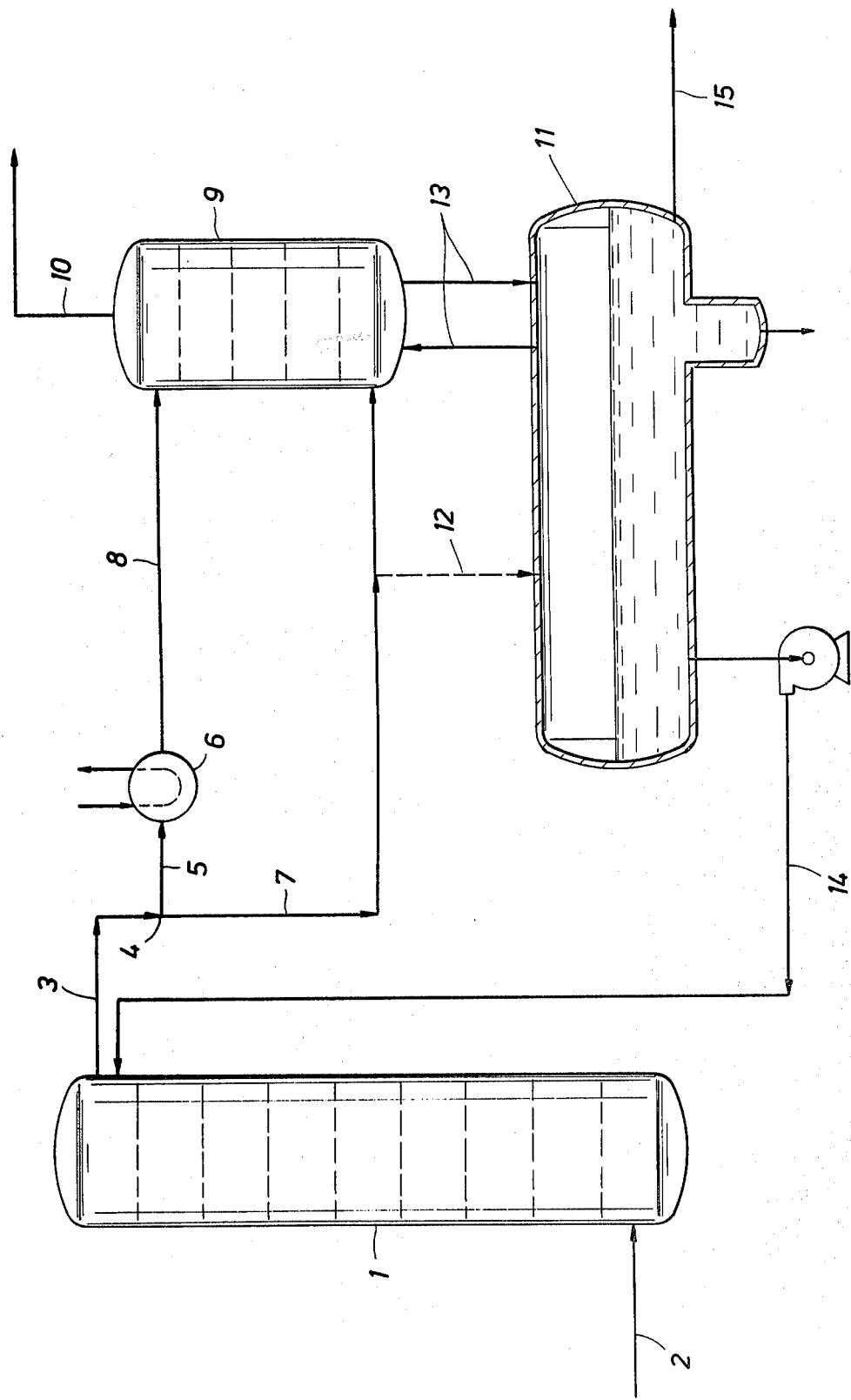
Figure 2:
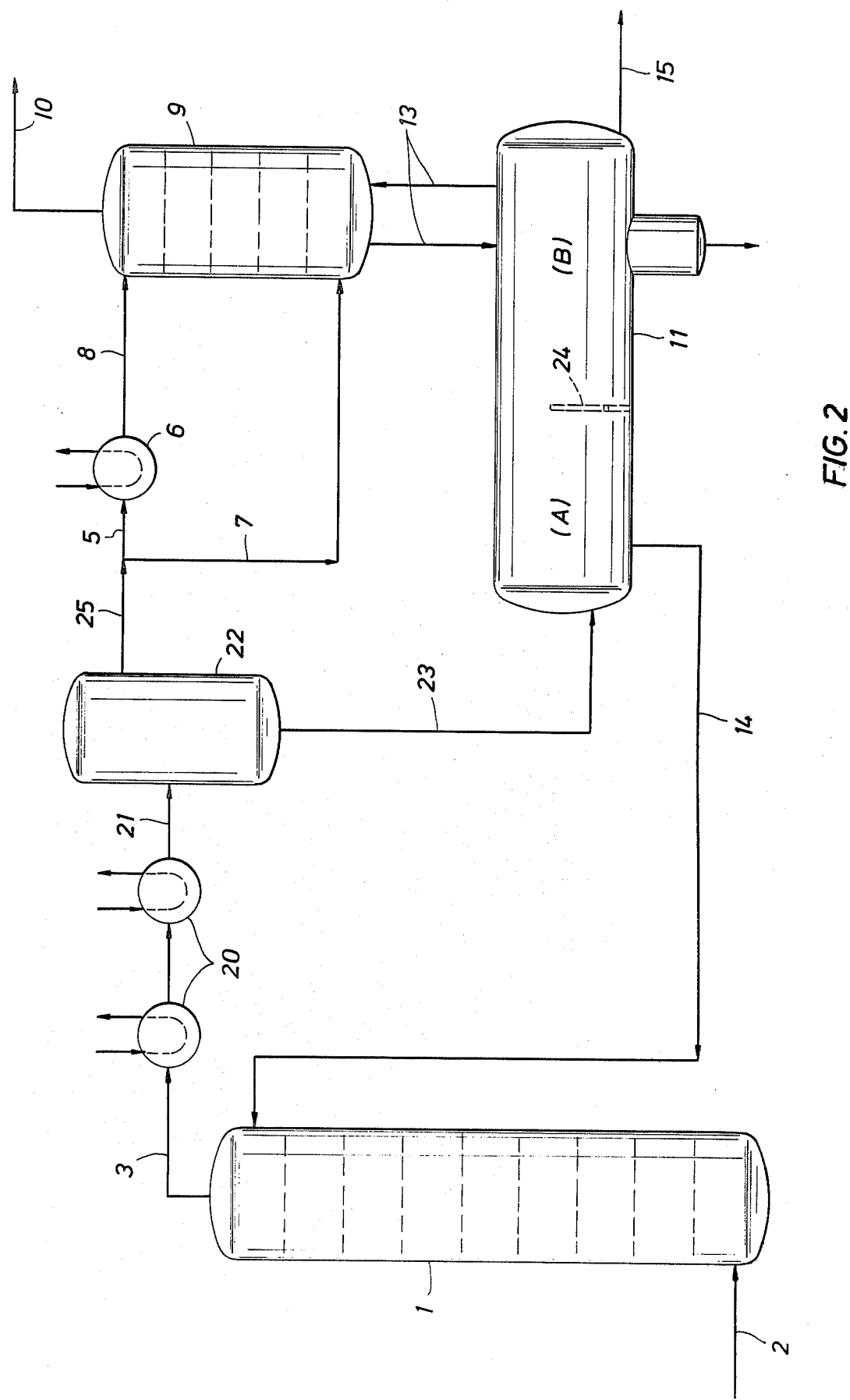

In order to describe the invention in greater detail, reference is made to the accompanying schematic drawing. FIG. 1 illustrates the general concept of the invention, while FIG. 2 represents the preferred embodiment of the invention. All values mentioned are calculated or exemplary.

Referring to FIG. 1, numeral (1) designates a distillation column, preferably a fractionating column for a naphtha top product. The feed, e.g. crude oil, enters column (1) through line (2), and is fractionated in a known fashion. Various draw-offs are provided (not shown), and overhead vapor exits column (1) through line (3) at a temperature of about 340° F. The overhead vapor is divided at (4) into major and minor portions, the major portion proceeding through line (5) to condensation zone (6). A minor portion, in this case about 10 percent by weight, based on the total weight of the overhead fraction, is removed via line (7), as more fully discussed hereinafter.

In condensation zone (6) the bulk of the major portion is condensed. As indicated, all of the major portion may be condensed. For purposes of this illustration, the overhead is assumed to have a condensation range of about 200° F., e.g., to condense between about 340° F. and 140° F. at column operating pressure. The amount condensed is that sufficient to provide reflux for column (1) and adequate product recovery, and those skilled in the art may readily determine the amount to be condensed. Any suitable type of condenser or heat exchange system may be employed, as will also be evident to those skilled in the art. Preferably, the vapor is partially condensed in a plurality of stages, such as by direct heat exchange with another process stream, by air cooling, or by direct contact with condensate that has been cooled by exchange.

From zone (6), the vapor-liquid stream is passed through line (8) to vent contactor or vent absorber (9). Vent contactor (9) may suitably be a small tray type column (e.g., four trays) and contactor (9) serves the purpose of transferring heat from the vapor in line (7) to the liquid in the contactor. Thus, vapor in line (7) contacts the condenser effluent in contactor (9), and non-condensable vapors, if any, are removed overhead via line (10). Non-condensables in the vapor stream from line (7) tend to be absorbed in the cool liquid from condenser (6), and the liquid is reheated. The remaining non-condensables leave contactor (9) at roughly the condenser (6) outlet temperature so that the vent in line (10) may have roughly the same volume as if the vapor split was not made, but at the same time a higher accumulator liquid temperature is achieved. Vapor in line (7) may also be sent to the contactor (9) through accumulator (11) via line (12) (dotted line). Vapor and liquid communication between accumulator (11) and contactor (9) are provided by lines collectively indicated as (13). Reflux to column (1) is provided via line (14), and product (the top product of the column), may be removed via line (15). If use of a single pump is desired, product may be withdrawn via line (14), or alternatively, a draw-off tray may be provided in contactor (9).

As indicated, FIG. 2 represents the preferred embodiment of the invention. Similar numbers represent similar features. As illustrated, the procedure of FIG. 2 employs the accumulator or accumulation techniques of my aforementioned patent, although this is not critical. Accordingly, a naphtha feed enters column (1) through line (2), and is fractionated in a manner known to those skilled in the art. The overhead vapor fraction in line (3), at a temperature of about 380° F. (hotter than for FIG. 1 because of staged condensing), is condensed in condensation zone (20), preferably in a series of condensation stages. For example, the condensers may comprise shell and tube heat exchangers. The proportion condensed at this point will vary, depending on the requirements of the operation, and may be determined by those skilled in the art. Preferably, the overhead fraction is cooled to about 340° F., thus condensing an amount of liquid sufficient to provide reflux to column 1. From the last stage, a liquid-vapor stream is forwarded via line (21) to separation zone (22) where the vapor and liquid are separated. Separation zone (22) may comprise merely a centrifugal type entrainment separator, a typical vapor/liquid separator pot, or may be built into the condensing zone. Liquid is removed from zone (22) via line (23), and is forwarded to accumulator (11). Accumulator (11) may vary considerably in external design, but follows generally the requirements described in U.S. Pat. No. 4,235,706. More particularly, accumulator (11) is provided with a barrier (24) which divides the accumulator into two separate liquid-containing sections, there being only limited liquid communication between the two sections, as will be illustrated later. At the same time, barrier (24) is constructed so that it does not limit vapor flow in accumulating zone (11). Accordingly, liquid stream in line (23) enters accumulating zone (11) where it settles in accumulation section (A) formed by the walls of unit (11) and barrier (24). Vapor may occupy the entire open volume of unit (11). The temperature of liquid in section (A) will be about 340° F. Liquid from section (A) is returned via line (14) to column (1) to provide the reflux mentioned previously.

Concomitantly, the vapor removed in separator (22) is divided, in line (25), into major and minor portions. The major portion proceeds to condensation zone (6) via line (5). A minor portion, e.g., about 10 percent by weight, based on the total weight of the overhead fraction, is removed via line (7), as more fully discussed hereinafter.

In condensation zone (6) the bulk of the major portion is condensed. For purposes of this illustration, the overhead is assumed, as above, to have a condensation range of about 200° F., e.g., to condense between about 340° F. and 140° F. at column operating pressure. Similar to FIG. 1, the amount condensed in zones (20) and (6) is that sufficient to provide reflux for column (1) and adequate product recovery, while at the same time providing for enhanced heat recovery of the energy utilized in the distillation. Those skilled in the art may readily determine the amount to be condensed for adequate product recovery and reflux of the distillation column. Condensation units and techniques similar to those illustrated in connection with FIG. 1 may be employed, as will be evident to those skilled in the art. From zone (6), the liquid or vapor-liquid stream is passed through line (8) to vent contactor (9). Operation of this embodiment hereinafter corresponds to the procedure employed in connection with FIG. 1.

As will be recognized by those skilled in the art, the key to the invention is the contacting of a cool liquid portion of the overhead with the warmer vapor portion of the overhead. This permits operation of the product-containing sections of the accumulator at a higher temperature, and less heat will be required for further processing of the top-product.

The detailed description exemplifies a column overhead vapor composed of a mixture of compounds of differing boiling points, so that there is a temperature spread between the bubble and dew points of the mixture. The invention is most advantageously applied to such a mixture, particularly in the arrangement of FIG. 2. However, it is also useful, as noted, for the distillation of mixtures producing pure or nearly pure compound as top product. It is not practical to operate the condenser of such a column to produce liquid product at its bubble point without loss of some product as vapor. Therefore, out of practical necessity, condensers of such columns are operated to subcool the product to prevent this loss of vapor. Use of this invention will allow the reheating of product to the bubble point without the vapor loss.

What is claimed is:

1. A process comprising
    (a) distilling a multi-component liquid in a distillation column under conditions effective to provide an overhead vapor fraction having a temperature differential of at least 20° F. between its dew point and its bubble point;
    (b) condensing a portion of the overhead fraction in a first condensation zone having at least one condensation stage, and producing liquid condensate and partially cooled vapor;
    (c) passing liquid condensate from the condensation zone of step (b) to an accumulation zone, and passing partially cooled vapor from the condensation zone of step (b) and separating said partially cooled vapor into a major portion and a minor portion;
    (d) condensing at least the bulk of said major portion of partially cooled vapor in a second condensation zone having at least one condensation stage, and producing a condensation zone effluent comprising liquid or vapor and liquid;
    (e) passing condensation zone effluent from the second condensation zone to a contacting zone, and contacting said condensation zone effluent with at least a portion of the minor portion of the partially cooled vapor in the contacting zone, and producing a liquid fraction; and
    (f) collecting the liquid fraction from the contacting zone of step (e) in an accumulation zone.

2. The process of claim 1 wherein the accumulation zone comprises a first accumulation section and a second accumulation section having vapor communication with the first accumulation section but being separated from said first accumulation section by a barrier which provides limited flow of liquid between the first accumulation section and the second accumulation section, the first accumulation section and the second accumulation section being at different liquid temperatures, and wherein reflux liquid is returned to the distillation column from the first accumulation section, and vapor from both accumulation sections is passed to the contacting zone.

3. The process of claim 1 wherein the multi-component liquid is a crude oil.

4. The process of claim 2 wherein the multi-component liquid is a crude oil.

* * * * *